July 27, 1965 G. LEISCHNER 3,197,660

FREQUENCY CONVERTER

Filed Aug. 30, 1961 3 Sheets-Sheet 1

INVENTOR

GEORG LEISCHNER

BY Irwin S. Thompson

ATTY.

July 27, 1965 G. LEISCHNER 3,197,660

FREQUENCY CONVERTER

Filed Aug. 30, 1961 3 Sheets-Sheet 2

INVENTOR
GEORG LEISCHNER
By Irwin S. Thompson
ATTY.

July 27, 1965 G. LEISCHNER 3,197,660

FREQUENCY CONVERTER

Filed Aug. 30, 1961

3 Sheets-Sheet 3

INVENTOR

GEORG LEISCHNER

By Irwin S. Thompson

ATTY.

United States Patent Office 3,197,660

Patented July 27, 1965

3,197,660

FREQUENCY CONVERTER

Georg Leischner, Zurich, Switzerland, assignor to Marie Cecile Kissling, Geneva, Switzerland Filed Aug. 30, 1961, Ser. No. 134,894
Claims priority, application Switzerland, Sept. 9, 1960, 10,201/60
16 Claims. (Cl. 310—160)

An object of the present invention is an electric machine having several stator windings and rotor windings presenting different numbers of poles, whereby said inducted stator windings operate at different frequencies, while the rotor windings are energized with direct current, which machine, however, has one unique flux conductor system. This machine is characterized by the fact that the rotor or inductor excitation current conductors of the motor and/or of the generator part of different numbers of poles carrying energizing current flowing in opposite direction are located in different grooves or openings of the poles.

Said induced stator windings may work as a generator, when the machine is driven by means of a motor and herewith current of different frequencies are induced in said stator windings.

Further, the machine of the invention may also work at the same time both as a motor and as a generator when, for example, one of the stator windings is fed with A.-C. current by means of the network, whereas another stator winding furnishes A.-C. current of another frequency. In this case, the machine functions as a frequency transformer, whereby said machine presents the advantage that it comprises only one magnetic flux conductor system. Said common flux conductor system is constituted by the laminated stator iron packet and the rotor body which works as an inductor, the excitation windings of which are energized with direct current.

The attached drawings show the electric machine according to the invention, part schematically, in different forms of execution.

Figure 1:
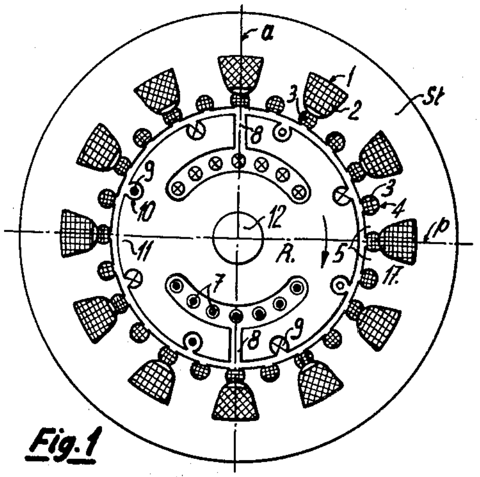
FIGS. 1 and 2 are cross sections of the machine in different embodiments thereof.

The embodiment according to FIG. 1 shows in cross section the electric and the active magnetic parts of the machine. The laminated iron stator body *St* presents, for example, twelve large groove orifices 1 which contain the rotary field winding 2 of a two pole motor. Said winding 2 is fed with three-phase A.-C. current through a network operating at a frequency of 50 c.p.s.

An eight pole generator winding 3 for a higher frequency, for example, 200 c.p.s. is located in smaller groove orifices 4, half of which constitutes a neck shaped prolongation of the larger grooves 1 containing the winding 2. The other half of said smaller groove orifices 4 are on the contrary located between the teeth 5 of the stator body *St*.

The rotor or inductor R is provided with a motor excitation winding 7 which, for example, has two poles and is mounted in pole openings 8 located on a diameter. The two pole rotor R is similar in its shape and operation to the known double T rotor. However, on its periphery this rotor is provided with an excitation winding 9 which is housed in grooves 10, winding 9 having, for example as shown in FIG. 1, eight poles and being wound around the pole arms 11. If the rotor windings 7 and and 9 are fed with direct current then, when the rotor R runs, said winding 7 induces the stator winding 2 and the winding 9 induces the stator winding 3 without disturbing one another.

If the rotor is driven in rotation through the shaft 12 by means of a separate drive, then the two stator windings 2 and 3 may function as a generator. If, on the contrary, the two pole stator winding 2 is fed with a 50 cycle three-phase current, then the rotor R runs at a speed of 3000 revolutions per minute and the eight pole rotor winding 8 induces in the eight pole stator winding 3 an A.-C. voltage of two hundred cycles. The eight pole stator winding 3 may also be fed with three-phase current whereby the two pole winding 2 furnishes then an A.-C. current of corresponding lower frequency, which serves as the energy supply.

Figure 2:
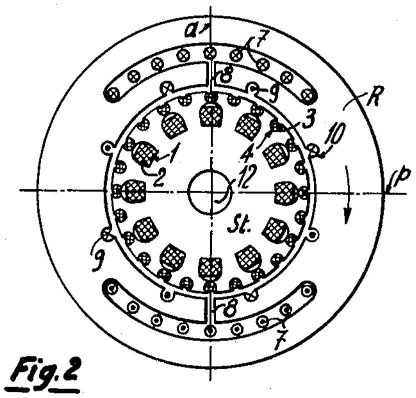

FIG. 2 shows schematically in cross section the active parts which are the same in principle as FIG. 1, however, with interchanged functions of the rotor and stator. The stator *St* is arranged inside of the rotor R, which runs around the outside of stator *St*. The reference numerals used in FIG. 2 are analogous to those appearing in FIG. 1. Moreover, the manner of operation of the construction shown in FIG. 2 is similar to the operation of the machine of FIG. 1.

Figures 3, 4, 5, 19:
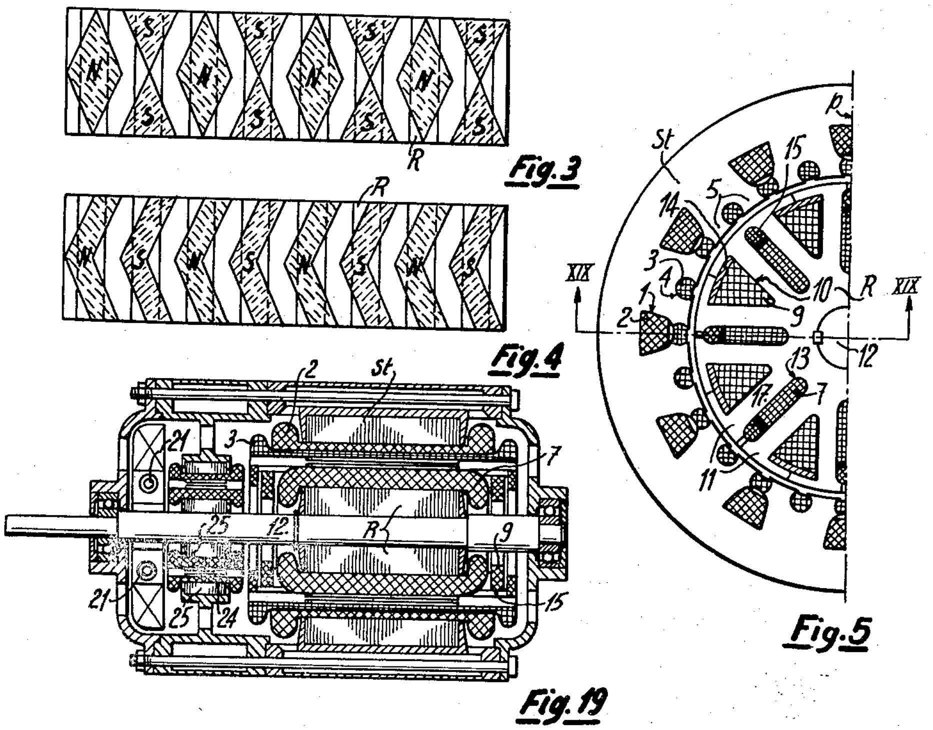
FIGS. 3 and 4 are plan developed views of the pole surfaces of two differently designed rotors.
FIG. 5 is a part cross section through the stator and the rotor having another form.
FIG. 19 is a longitudinal cross section of a machine according to FIG. 18 which is provided with a variant of the energizing device, the stator and rotor of which are cut along the line XIX—XIX of FIG. 5.

FIGS. 3 and 4 show in developed views two examples of the shape of the pole surfaces which may be used in order to obtain voltages and currents of sinusoidal shape, the air-gap being of constant size. The pole surfaces N and S of two forms of execution of an eight pole inductor R for the 200 cycle machines according to the invention are represented. As shown, the grooves *n* are straight and are partly overlapped from the pole surfaces.

FIG. 5 shows the partial cross section of another form of machine which has actually been manufactured. The inductor or rotor R functions as a motor having two poles and as a generator having eight poles. Of the pole arms 11 of the eight pole system, three are completely visible and only the halves of two others are visible. The pole arms 11 surround the excitation winding 9, which is fed with direct current. In pole arms 11 there are further winding grooves 13 in which the motor excitation winding 7, for example (FIG. 5) a two pole winding, is housed. In the partial representation of FIG. 5, however, only one of the sides of the spool for excitation winding 7 is visible, winding 7 being distributed on three spools. The sides of the other spools are located in the diametrically opposite pole arms 11 of the nonrepresented half of the inductor R. The inductor R is rigidly keyed on the shaft 12 and runs inside the fixed stator *St* which contains a motor rotary field winding 2 fed with three-phase current and a generator winding 3 for higher frequency.

The pole arm inductor or rotor R may be constituted either of massive iron or of sheet iron. If it is constituted of massive iron or steel, then rotor R starts easily, for the motor's rotary field winding 2 of the stator *St* induces in the mass of said stator large eddy currents. When, after starting, the rotor R has reached approximately the speed of the stator's rotating field, then the polarized field of the motor's direct current excitation winding 7 pulls the rotor into synchronism. Further, the motor's excitation winding 9 energizes the pole arms 11 of the rotor body R, whereby the fields of different numbers of poles are superimposed.

If, however, the rotor body R is built up with laminations of sheet iron, stacked in the axial direction, then eddy currents cannot be developed as a result of the induction of the stator rotary field. It is then necessary to provide a distinct starting winding. Such a starting winding may be constituted by metal closing wedges 14 which cover the excitation winding 9 housed in the pole openings to hold winding 9 in place radially against the centrifugal force. The metal wedges 14 are short circuited by means of short circuit rings (not shown) on both sides of the rotor or each pair of wedges 14 located diametrically oppoiste each other may be short circuited by means of front connections.

The distinct starting winding may also comprise metal or copper bars 15 disposed at any point in the grooves 13 in which the excitation winding 7 is housed. Copper bars 15 could be short circuited by means of short circuit rings or by means of front connections.

Further, the metal wedges 14 may be used together with the bars 15, as a common starting winding whereby wedges 14 and bars 15 are then hot-sealed at one side or soldered to a common metal ring, whereas on the other side the wedges 14 and bars 15 are interconnected, according to their active pole pitch, by means of front connections.

The starting winding is used during operation of the machine, especially in the case of sudden increases of load, as a damping winding to prevent the machine from falling or slipping out of synchronism.

A machine used for the conversion of three-phase current from 50 c.p.s. to 200 c.p.s. has been provided with a rotor according to FIG. 5, the eight pole arms 11 of which were provided with pole pieces according to FIG. 3. According to measurements made on a cathode-ray oscillograph, this machine in operation produces a current in the 200 cycle winding which has a very accurate sinusoidal waveform, without any higher harmonic components. The corresponding voltage curve also has no distorting harmonic components. Further, sinusoidal current and voltage wave shapes in the 50 cycle stator motor winding have been simultaneously observed. The true sinusoidal waveforms in the 50 cycle winding result mainly from the uniform distribution of the rotor field winding 7 (three part spools 7) which differentiates from conventional, concentrated windings having a single unique spool. With a second test rotor having a concentrated 50 cycle excitation winding and rectangular pole pieces for the 200 cycle inductor, very large higher harmonic components have been observed in the windings 2 and 3 of the same stator.

Consequently, the arrangements of the pole pieces according to FIGS. 3 and 4, as well as of the distributed excitation winding 7 according to FIG. 5, are necessary in order to obtain proper and accurate functioning of the machine according to the invention having superimposed rotary fluxes or fields of different frequencies.

With the rotary inductor of FIG. 5 provided with pole pieces according to FIG. 3 or 4, the problem of unilateral magnetic forces which may appear between the rotor field and the stator field is solved. The unilateral magnetic pull forces result from an unsymmetrical distribution of the excitation ampere-windings, i.e. of the current conductors in the conductor. Such forces always appear when conductors of the two excitation windings, which have different numbers of poles and in which the current flows in opposite direction, lie one with the other in a common winding space, i.e. in the same groove or pole opening. The resulting magnetic unsymmetry causes magnetic humming, disturbing the even mechanical running, and even possibly causing the rotor and stator to strike one another. These serious drawbacks have from the beginning prevented the development of any alternating current machines having superimposed rotary fluxes.

With the machines according to the invention, all such difficulties are completely eliminated. A test machine provided with a rotor according to FIG. 5 for conversion of three-phase current of 50 c.p.s. up to 200 c.p.s. runs as noiselessly as the standard modern three-phase current motor, and it generates no more magnetic humming.

The advantages of the machine of the invention could also be reached by housing the inductor's excitation windings having different numbers of poles within distinct winding spaces. However, if the conductors of windings having different numbers of poles must be housed in the same winding space, then this can be done only with the conductors for which the excitation currents flows in the same direction. Consequently, those winding spaces that house excitation winding conductors in which the current flows in the same direction may also be connected to one another by means of slots or apertures made in the magnetic flux conductor of the rotor R, so that they constitute a common winding space. If the inductor ampere-windings or conductors of different numbers of poles but carrying currents flowing in the same direction are brought together into the same winding space, or into winding spaces connected by slots made in the flux conductor of the inductor, then there should be considered not only the directions of the current flow but also the sum of the ampere-windings united in this way relative to a symmetrical distribution of the field strength on the periphery of the inductor.

The remaining figures of the appended drawings show different embodiments of rotors schematically and in cross section. In these figures the conductors are schematically represented by a cross or a point, depending upon the direction of the current in said conductors.

Figure 6:
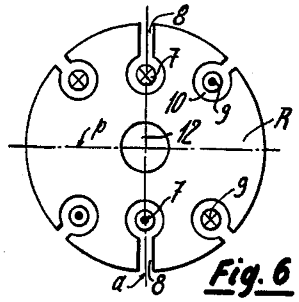
FIGS. 6 to 17 are schematical part cross sections of different forms of the rotor in which the disposition of the winding spaces provided with the windings are shown.

FIG. 6 illustrates a rotor body R having a two pole excitation winding 7, which is concentrated into two diametrically opposed grooves 8. The excitation winding 9 for the higher frequency has four poles. In this instance, the frequency conversion has the ratio 1:2.

With a machine of this kind, an alternating three-phase current of 50 c.p.s. may be converted to 100 c.p.s. Further, a three-phase current of greater frequency of 200 c.p.s. in an existing network of a converter plant may be converted up to 400 c.p.s., whenever only a relatively small power is needed for particular tools. The motor's two pole excitation winding 7 induces in a two pole stator winding a current of 200 c.p.s. when the rotor R runs at 12,000 revolutions per minute. The generator's four pole excitation winding 9 induces 400 c.p.s. in a four pole stator winding 3. The specific power of such a frequency-intermediate convertor is very high, because of the high speed of rotation, and the losses will be small. This intermediate frequency conversion may also be performed from the higher value downward when, for example, a converter network for 400 c.p.s. is already existing and only a little power at 200 c.p.s. is needed. In converters according to the invention, in order to convert the frequency in either direction, the rotor starting winding should be made sensitive to both stator windings 2 and 3, whether these windings work as a motor or as a generator.

Figure 7:
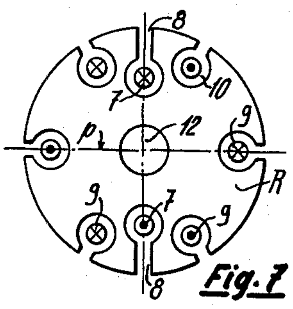

FIG. 7 shows a rotor body R having a two pole excitation winding 7, which is concentrated into two diametrically opposite grooves 8. The excitation winding 9 for the higher frequency has six poles. The operation and the possibilities of use are analogous to the construction of FIG. 6, but the frequencies conversion ratio is 1:3. The representation in FIG. 6 is schematic, and such details as, for example, the starting winding are not visible.

Figure 8:
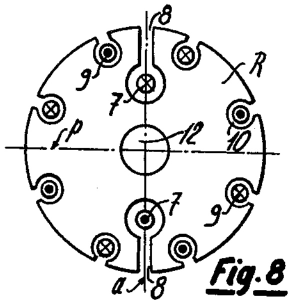

FIG. 8 shows schematically a rotor body R having the two pole excitation winding 7 as well as the eight pole excitation winding 9.

Figure 9:
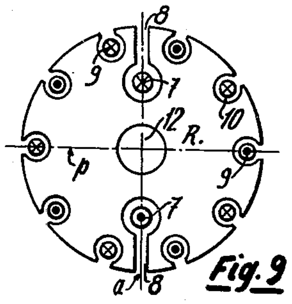

FIG. 9 shows schematically a rotor body R having a two pole excitation winding 7 as well as a ten pole excitation winding 9.

Figure 10:
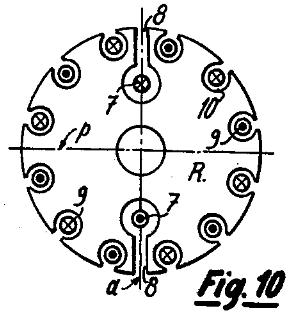

FIG. 10 shows schematically also a rotor body R having a two pole excitation winding 7 and a twelve pole excitation winding 9.

Figure 11:
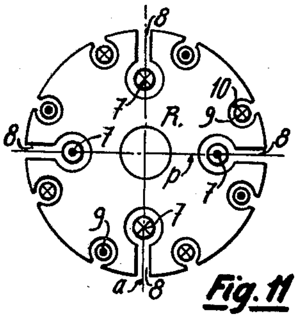

FIG. 11 shows schematically a rotor body R having a four pole excitation winding 7 which is concentrated within the grooves 8, as well as an eight pole excitation winding 9. The functioning and uses of the latter rotor are analogous to the rotors according to FIGS. 6 to 10.

Figure 12:
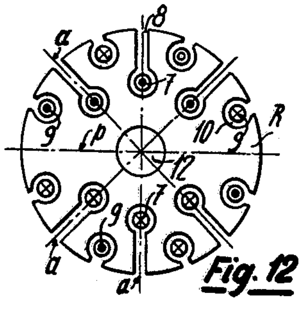

FIG. 12 shows schematically and in cross section a rotor body R. The two pole excitation winding 7 is distributed in the grooves 8 and is divided into three spools. The excitation winding 9 has eight poles and is also housed within the grooves 10 made in the periphery of the iron body which is rigidly wedged on the shaft 12. Said rotor corresponds in principle to the rotor of FIG. 5, inasmuch as this may be shown schematically. From this basic form of execution according to FIG. 12 there are derived the forms of execution according to FIGS. 13 and 14.

Figure 14:
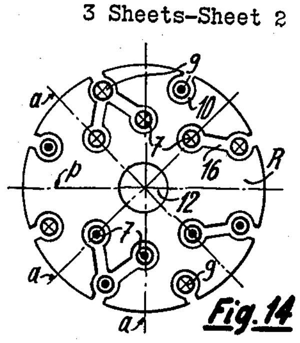
Figure 13:
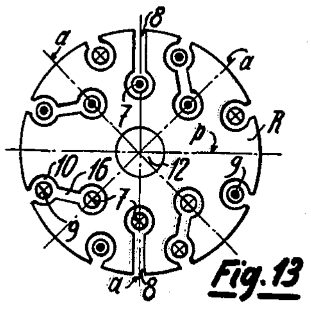

With respect to the number of poles and the arrangement in space, the rotor body R of FIGS. 13 and 14 is analogous to the form illustrated by FIG. 12. On the contrary, the winding spaces of the two pole excitation winding 7 are connected by means of slots 16 with the winding spaces of the eight pole excitation winding 9, the direction of the current flow of which is the same. The two rotor forms according to FIGS. 13 and 14 may also be employed for other numbers of poles with another distribution of the excitation winding 7. Such an example is illustrated by FIGS. 15 to 17.

Figure 15:
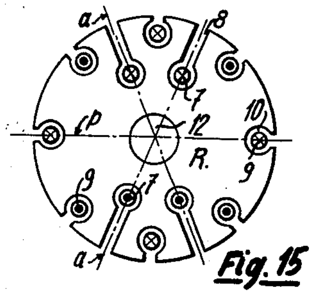

FIG. 15 represents a rotor body R rigidly wedged on the shaft 12 having a two pole excitation winding 7 which is distributed in the grooves 10 and on two spools. The grooves 10 of said winding are opened toward the periphery of the rotor body R in the same way as the grooves of the eight pole excitation winding 9.

Figure 16:
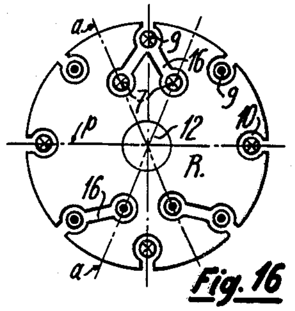
Figure 17:
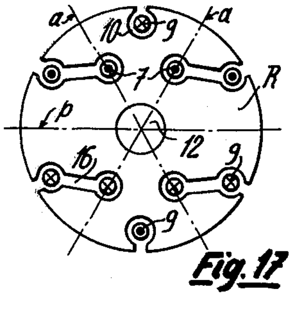

The rotor body R in FIGS. 16 and 17 is, concerning the number of poles and the arrangement in the space of the excitation windings 7 and 9, analogous to the form illustrated in FIG. 15. On the contrary, the winding spaces of the two pole excitation winding 7 are connected, by means of slots, with the winding spaces of the eight pole excitation winding 9, the direction of the current flow of which is the same, and which further are located in the same sector of the pole axis of the field space of the lesser number of poles of a pair of half poles.

The pole axes are illustrated in FIGS. 5 to 17 by means of dot and dash pattern *p*. They run through the middle of each of two adjacent poles of different polarities.

For two pole rotors, the pole axes which are constituted by two halves of the north and south poles, form an angle of 180°. For four pole rotors (FIG. 11), the axes *p* of an adjacent pair of poles form an angle of 90°.

The winding spaces of the windings 7 and 9, which have a different number of poles (FIGS. 13, 14, 16 and 17) and are connected together by means of the slots 16, may also each be made as a common winding groove of any suitable form, as far as it is practical of utility. For example, the grooves of the described rotors may have the same shape as the stator grooves 1 of FIGS. 1 and 2.

With such winding grooves combinations, which consist of a larger and one or several smaller grooves, and from the technical winding point of view, it is easier to insulate the two stator windings 2 and 3 (FIGS. 1 and 2) from one another by closing the groove containing the winding 2 with a cover bar 17 made of insulating material, before lying the winding 3 in the upper part of the groove. Cover bar 17, located between the two stator windings 2 and 3, may also be made of metal enveloped into a tubular shaped layer of electric insulating material. If now the intermediate metal layers of cover bars 17 of all the grooves are grounded, then the higher voltage of the motor winding 2 can never cross onto the lower voltage side of the higher frequency winding 3, even if winding failures occur. The connection to ground of the stator iron body, in which further the other parts of the winding 3 lie in the separate grooves 4, is a condition for protective measures against contact.

However, if cover bars 17, i.e., their metallic intermediate layers, are made of a ferro-magnetic material, then a stray flux can grow up in said bars for example iron bars between the said two stator windings 2 and 3. Said intermediate layers 17 located between the windings 2 and 3 may be designed in such a manner that they constitute the magnetic return paths for the rotary flux of higher frequency, so that practically such flux is maintained away from the outer motor's iron back.

The intermediate layers 17 may also be made either of nonmagnetic or of magnetic material with a U shaped cross section and lying against the walls of the small grooves 4.

Figure 18:
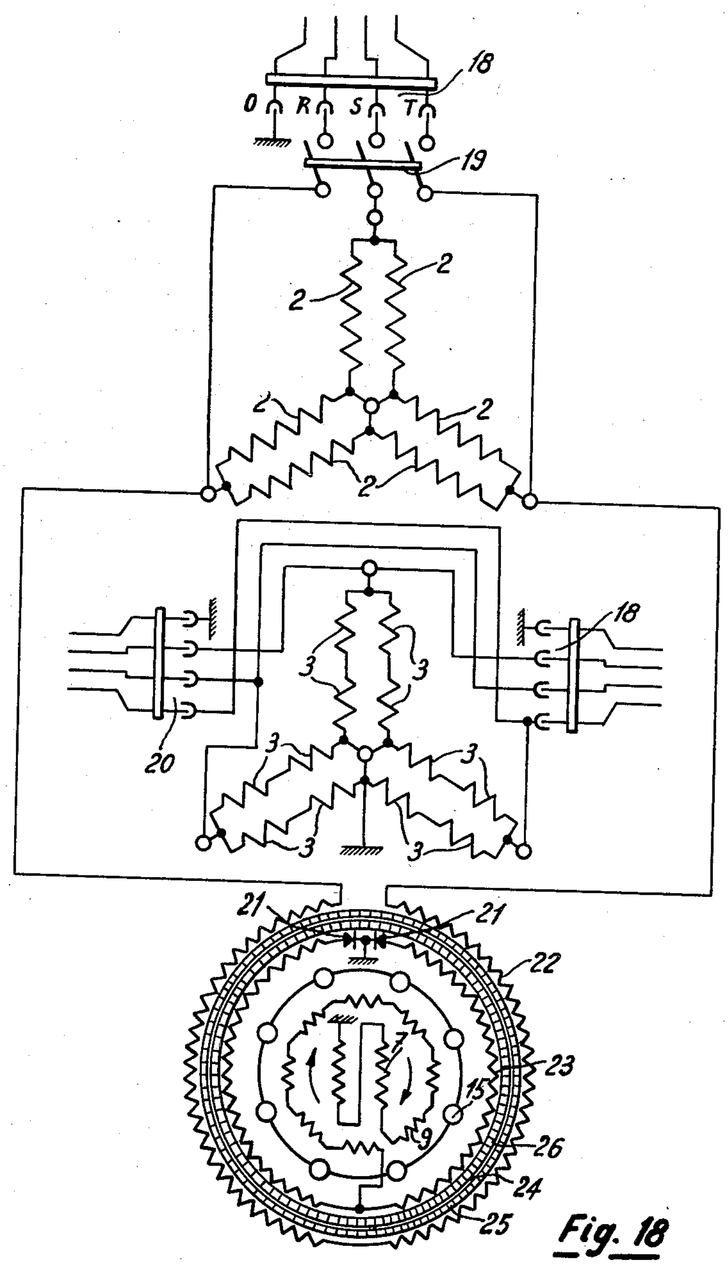
FIG. 18 is a scheme of a frequency transformer according to the invention.

FIG. 18 is a schematic representation of a frequency transformer according to the present invention. The 50 cycle three-phase current is fed to the motor's stator winding 2 by means of a wall plug 18 and of a switch 19. Said winding 2 has, for example, two windings for each phase which are electrically separate. Said windings are connected in a parallel-star connection.

The generator's winding 3 presents, for example, four spools for each phase which are electrically separate and which may be connected at will, for example, as shown in a series-parallel-star connection. At the terminals of said winding 3 are connected wall plugs 20, the conductors of which connect to the users of higher frequencies. The star point of said winding 3 is connected to ground.

The excitation windings 7 and 9 of the rotor R are fed by means of two rectifiers 21. It is of advantage hereto to use the known silicium power diodes, for they withstand the centrifugal forces imposed, as well as working temperatures of 150° C. The A.-C. current for the excitation is furnished from the three-phase network which feeds the motor winding 2 and the primary stator winding 22 of a transformer T. Through induction across an air-gap 24 the excitation current is induced in a rotative secondary winding 23 and is impressed across the rectifiers 21 and the windings 7 and 9, whereby one of each terminal is connected to the mass of the rotor R. In order to transform the excitation current from the higher voltage of the electrical distribution mains to the lower voltage of the excitation windings 7 and 9, a known radial laminated transformer may be used. The iron core of this transformer is constituted by two parts 25, 26, which are separated from each other by the air-gap 24. The one part 25 is fixed with the primary winding 22 into the stator casing. The other part 26 which bears the secondary winding 23 is fastened onto the rotor shaft 12 and runs with the rotor R.

As shown in FIG. 19, the transforming member may also comprise a standard, small, three-phase current motor stator (FIG. 19) having grooved, laminated iron packets. The primary winding 25 is then wound as a three-phase winding and connected to the three-phase network. The secondary winding 26 is connected for either three-phase or six-phase, and the excitation current may be fed by means of three or six diodes 21 to the rotor excitation windings 7 and 9. The three-phase primary winding is connected in such a manner that the rotary field runs in the opposite direction from the rotor. Then for the stationary state, the frequency in the secondary winding is equal to the frequency in the primary winding, while at the service speed the frequency in the secondary winding is twice the frequency of the three-phase current feeding the primary winding.

The excitation current could also be furnished from the higher frequency winding 3. Further it is possible, for example, to furnish the basic excitation from the 50 cycle winding 2. The basic excitation provides the nominal voltage to feed the rotary field excitation transformer with the load current of winding 3, applied through a second winding, where the transformer has a different number of poles from the number of poles of the first winding in the main current connection. The load current of the winding 3 controls the rotor field excitation in accordance with the load, so that the voltage at the terminals of the winding 3 is practically constant.

I claim:

1. In a frequency converter comprising a rotor and a stator, an excitation low frequency multi-phase winding and a generator low frequency multi-phase winding, said rotor carrying one of said low frequency windings and said stator carrying said other low frequency winding, an excitation intermediate frequency multi-phase winding and a generator intermediate frequency multi-phase winding, said rotor carrying one of said intermediate frequency windings and said stator carrying said other intermediate frequency winding, means including said low frequency windings for producing within the bodies of said rotor and of said stator a corresponding low number of pairs of magnetic poles, and means including said intermediate frequency windings for producing in said bodies a corresponding higher number of pairs of magnetic poles, the ratio between said low number of pairs of magnetic poles and said higher number of pairs of magnetic poles being defined by the ratio between said low and said intermediate frequencies, said low frequency excitation winding being housed in grooves which are located upon the median axes of said higher number of pairs of magnetic poles.

2. A frequency converter as claimed in claim 1 in which both said low frequency windings and said intermediate frequency winding carry currents which flow in the same direction.

3. A frequency converter as claimed in claim 1 in which said rotor contains winding grooves in which are located sad one low frequency winding and said one intermediate frequency winding, in which windings flow a direct current having the same direction, said rotor winding grooves being connected by slots in the rotor.

4. A frequency converter as claimed in claim 3, in which the windings carried by said stator are housed within different winding grooves, and in which said other low frequency winding is located within large grooves, said large grooves having neck shaped prolongations in which are housed one side of the spools of said other intermediate frequency winding, and further grooves of lesser dimensions made in the stator teeth defined by said large groove and disposed therebetween, the other side of the spools of said last mentioned winding being housed in said further grooves.

5. A frequency converter as claimed in claim 4 in which metal wedges enveloped in an electric insulating material are located in said large grooves and between the windings carired by said stator.

6. A frequency converter as claimed in claim 5 in which said electric insulating metal wedges are made of iron.

7. A frequency converter as claimed in claim 5, in which said electric insulating metal wedges are U-shaped.

8. A frequency converter as claimed in claim 5, in which said electric insulating metal wedges are grounded by means of a connection to the casing of the converter.

9. A frequency converter as claimed in claim 6 comprising a two pole rotor having the shape of a double T rotor, said two pole winding being housed within the pole openings of said rotor, grooves made in the periphery of the pole shoes housing said intermediate frequency excitation winding.

10. A frequency converter as claimed in claim 5 comprising means for electrically connecting said metal wedges one with the other so that said wedges and said electrical connecting means constitute simultaneously a starting cage.

11. A frequency converter as claimed in claim 5, further comprising metal bars disposed in said grooves of the rotor in which the excitation winding is located, and connectors for electrically connecting said bars one with the other so that said bars and said connectors constitute a squirrel cage acting as starting and damping cage.

12. A frequency converter as claimed in claim 5 in which said rotor has pole surfaces corresponding to the intermediate frequency which are of trapezoidal shape.

13. A frequency converter as claimed in claim 5 in which said rotor has pole surfaces corresponding to the intermediate frequency which are of the shape of an arrow.

14. A frequency converter as claimed in claim 5 in which said rotor has pole surfaces corresponding to the intermediate frequency which are of a convex, arcuate shape.

15. A frequency converter as claimed in claim 5, further comprising dry plate rectifiers fastened to the rotor, and means for connecting said dry plate rectifiers to said rotor excitation winding to energize the latter.

16. A frequency converter as claimed in claim 15, further comprising a transformer feeding said dry plate rectifier, the primary winding of said transformer being stationary and the secondary winding being rotative, the magnetic circuit of said transformer being made up of two parts, the first part carrying said primary winding being fastened to the stator of the machine and the second part of said magnetic circuit carrying said secondary winding being rigidly fastened to said rotor of the machine.

References Cited by the Examiner

UNITED STATES PATENTS

| | | | |
|---|---|---|---|
| 1,092,420 | 4/14 | Alexanderson | 310—160 X |
| 1,559,103 | 10/25 | Hull | 321—64 |
| 1,698,976 | 1/29 | Weichel | 310—160 |
| 1,806,386 | 5/31 | Bunet | 310—160 |

MILTON O. HIRSHFIELD, *Primary Examiner.*